(12) United States Patent
Yun et al.

(10) Patent No.: US 7,864,426 B2
(45) Date of Patent: Jan. 4, 2011

(54) HIGH ASPECT-RATIO X-RAY DIFFRACTIVE STRUCTURE STABILIZATION METHODS AND SYSTEMS

(75) Inventors: Wenbing Yun, Walnut Creek, CA (US); Alan Francis Lyon, Berkeley, CA (US); Yan Feng, Pleasanton, CA (US)

(73) Assignee: Xradia, Inc., Pleasanton, CA (US)

( * ) Notice: Subject to any disclaimer, the term of this patent is extended or adjusted under 35 U.S.C. 154(b) by 344 days.

(21) Appl. No.: 11/674,532

(22) Filed: Feb. 13, 2007

(65) Prior Publication Data
US 2008/0192347 A1 Aug. 14, 2008

(51) Int. Cl.
G02B 5/18 (2006.01)
(52) U.S. Cl. .................. 359/573; 359/569; 378/70
(58) Field of Classification Search .......... 359/566, 359/569, 573; 378/70, 154, 155
See application file for complete search history.

(56) References Cited

U.S. PATENT DOCUMENTS 6,510,200 B1 * 1/2003 Martynov et al. ........... 378/84
6,815,363 B2 * 11/2004 Yun et al. ................... 438/710
2003/0206340 A1 * 11/2003 Goldstein ................... 359/361
2005/0243423 A1 * 11/2005 Nakai et al. ................ 359/566
2006/0127830 A1 * 6/2006 Deng et al. ................. 431/188

* cited by examiner

*Primary Examiner*—Joshua L Pritchett
(74) *Attorney, Agent, or Firm*—Houston Eliseeva LLP

(57) ABSTRACT

A method to stabilize planar nanostructures, for example grating and zone plate lenses that are typically used for directing or focusing x-ray radiation, includes the deposition of a top, stabilizing layer. The structures are typically made on a flat substrate, and therefore are only fixed at the bottom. At high aspect ratio, the stability can be poor since small forces such as electrostatic forces and van de Waals forces that are often present can alter the structure. The top coating of a metallic material such as titanium constrains the nanostructures at the top and at the same time eliminates electrostatic forces and reduces any thermal gradient that may be present across the device.

27 Claims, 6 Drawing Sheets

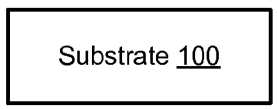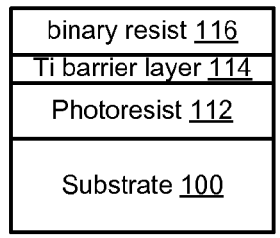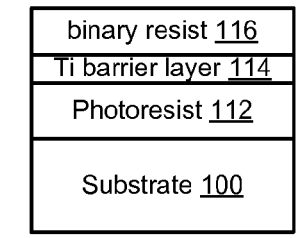
Fig. 2A　　　　　Fig. 2B　　　　　Fig. 2C
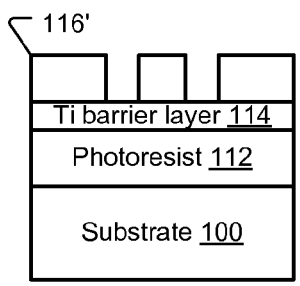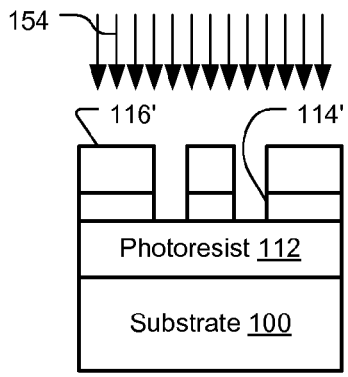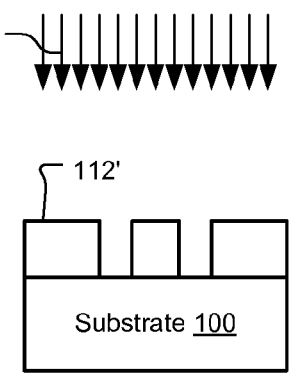
Fig. 2D　　　　　Fig. 2E　　　　　Fig. 2F
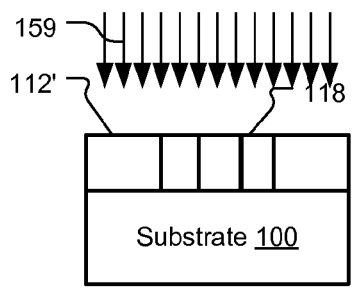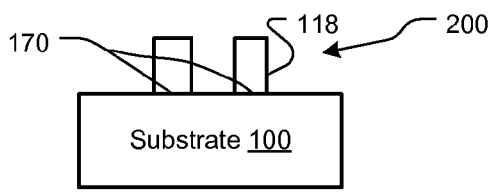
Fig. 2G　　　　　Fig. 2H

HIGH ASPECT-RATIO X-RAY DIFFRACTIVE STRUCTURE STABILIZATION METHODS AND SYSTEMS

BACKGROUND OF THE INVENTION

High-aspect ratio nanostructures with widths between 10 nanometers (nm) and several micrometers and a height-to-width ratio in the range of 5-100 are becoming more widely used in many fields such as micro-electronics, nanotechnology, and diffractive optics. Like tiny sky-scrapers (e.g. Sear's Tower has an aspect ratio of roughly 15), stabilization of these thin and tall structures is a major engineering hurdle. An important challenge in producing these nanostructures is developing methods to enhance their stability without compromising their performance. This can sometimes be done easily, particularly in systems with no moving parts, such as semiconductor integrated circuits, but is often difficult in most other applications.

Because of the wavelengths involved, diffractive x-ray optics presents some of the greatest challenges. Two examples are gratings and zone plate lenses. These optical elements include repeating structures that block or phase-shift x-ray radiation. As with visible light optics, x-ray gratings are typically used to deflect an x-ray beam and spectrally separate polychromatic beams. A zone plate can be thought of as a circular grating, but with decreasing grating period towards the rim according to the relation $r_n^2 = nl\ f_Z + an^2 l^2$. Such a zone plate behaves like a lens with focal length $f_Z = 2rdr/l$, where dr is the width of the outer-most and also the finest zone, and l is the wavelength. The diffraction limited resolution, according the Rayleigh criterion is simply d=1.22 dr, slightly larger than the outer zone width and independent of the wavelength.

Because of the short wavelength of x-ray radiation, feature sizes of x-ray optics must be very fine in order to diffract the beam to a large enough angle, but on the other hand the large penetration depth of x-ray radiation requires thick optics. As a consequence of these two properties, x-ray gratings and zone plates typically require high aspect ratios and the ratios increase when the x-ray energy is increased as the wavelength shortens and the penetration depth increases. For example, zone plates for focusing "soft" x rays with energy between 250 electron-Volts (eV) and 1000 eV typically have finest zone widths of 15-50 nm and aspect ratios of 3-10. For "hard" x rays with energies between 5 keV and 10 keV, the finest zone widths are 30-100 nm and aspect ratios are 15-30.

SUMMARY OF THE INVENTION

Although there are typically no moving parts in x-ray optical elements, stabilizing the nano-structures is more difficult than in integrated circuits. For example, filling the spaces between the structures with organic material is not possible because the material would not be stable under prolonged x-ray exposure and filling the spaces with metallic material will affect the differential x-ray absorption properties and consequently reduce the performance.

The present invention concerns stabilizing planar structures, including nanostructures, such as x-ray grating-like diffractive optical elements including gratings and zone plate lenses. These structures are typically made on a flat substrate, and therefore are only fixed at the bottom. At high aspect ratios, the stability can be poor since even electrostatic and van de Waals forces can alter the structure. Embodiments of the present invention involve the use of a top coating, possibly including metallic materials such as titanium, aluminum, or molybdenum, to constrain the nanostructures at the top and at the same time eliminate electrostatic forces, and also reduce any thermal gradients that may be present across the device.

In general, according to one aspect, the invention features a diffractive x-ray optic. Examples of such an optic include gratings and zone plate lenses, and also hybrid devices that use a combination of diffraction and refraction. The optic comprises a substrate; a diffractive layer on the substrate having structures forming a diffractive optic. A top layer is further provided. It is disposed on the opposite side of the diffractive layer from the substrate. This top layer bridges between at least some of structures.

In specific embodiments, the structures form a periodic grating diffractive optic and/or a zone plate lens diffractive optic. Preferred materials for the diffractive layer include gold, tungsten, and/or silicon.

In the current embodiment, the top layer is used to mechanically stabilize the structures, even when they have aspect ratios in the range of 10-50, and higher. Preferred materials for the top layer include titanium, molybdenum, and/or aluminum. The top layer should be thick enough to provide mechanical stability but thin enough so as to not substantially undermine the diffractive performance; currently the top layer has a thickness of 50-500 nm.

In general, according to another aspect, the invention features method for fabricating a diffractive x-ray optic. This method comprises forming a diffractive layer on a substrate with structures of a diffractive optic and depositing a top layer on an opposite side of the diffractive layer from the substrate, the top layer bridging between at least some of structures. For example, in the case of the zone plate, only the outer zones with the highest aspect ratios will be bridged, in some embodiments.

In a current embodiment, the deposition step includes depositing at least part of the top layer at an angle of angle of 30-75 degrees to a plane the substrate.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 2A-2H are schematic drawings illustrating of a lift-off fabrication process for a typical x-ray grating or zone plate lens;

DETAILED DESCRIPTION OF THE PREFERRED EMBODIMENTS

Gratings and zone plates are diffractive elements that manipulate light by the principle of diffraction. With x-ray radiation in the range of 100 eV and 10 keV, most materials provide little refractive effect but become very absorptive. As a consequence, diffractive optical elements have become the most effective means of changing the direction of and focusing x-ray beams. These diffractive optical elements are typically fabricated lithographically, with processes similar to that used in the fabrication of microelectromechanical systems (MEMS) and semiconductor integrated circuits. Two types of processes are often used today: 1. electroplating process shown in FIGS. 1A-1H; and a lift-off method shown in FIGS. 2A-2H.

FIGS. 1A-1H show an exemplary electroplating process for diffractive x-ray optics fabrication.

Figure 1A:
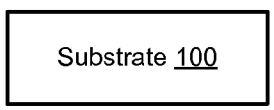
FIGS. 1A-1H are schematic drawings illustrating an electroplating fabrication process for a typical x-ray grating or zone plate lens.
Figure 1B:
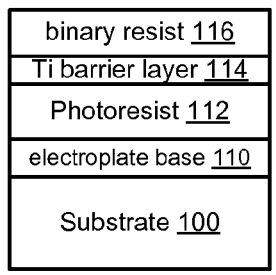

A substrate 100 is first coated with a conducting material that functions as an electroplate base 110, as illustrated in FIGS. 1A and 1B. Typically the conducting electroplate base 110 is gold or titanium (Ti), being several nanometers in thickness.

A first layer of photo-resist 112 is deposited on the electroplate base 110. The thickness of the first photo-resist 112 should equal the thickness of the desired nanostructures and is usually controlled with a spinning technique by adjusting the photo-resist viscosity and spinning speed.

Then a metal barrier layer 114, such as titanium, of several nanometers thickness is deposited on the first photoresist 112 followed by a thin layer of a binary photo-resist 116, as shown in FIG. 2B.

Figure 1C:
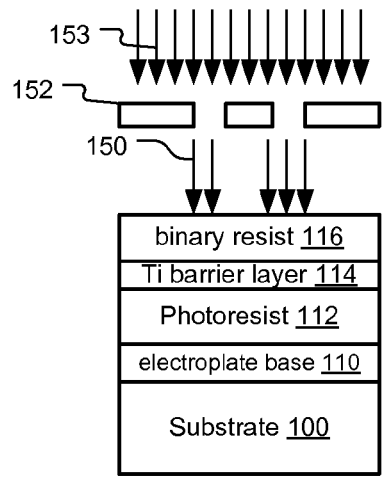

The desired pattern is then generated by selectively exposing the top layer binary photo-resist 116 with patterned radiation or energetic particles 153, as shown in FIG. 1C. In some examples, UV, EUV, or x-ray radiation is used in combination with a mask 152. In other examples, an electron beam writer is used to directly expose the desired radiation pattern into the binary resist layer 116.

Figure 1D:
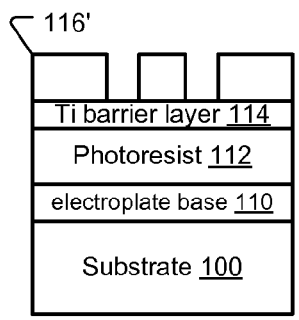
Figure 1E:
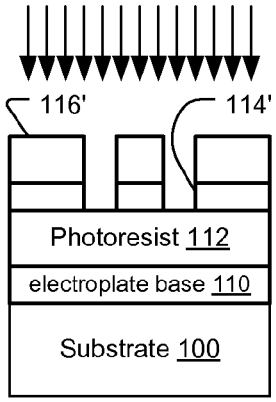

After the exposure process, a wet chemical etch process is used to remove the irradiated regions and thereby create a patterned binary photo-resist 116'. This selectively exposes the titanium barrier layer 114, as shown in FIG. 1D. A further wet chemical etching process 154 removes the exposed titanium regions to form a patterned titanium layer 114', as shown in FIG. 1E.

Figure 1F:
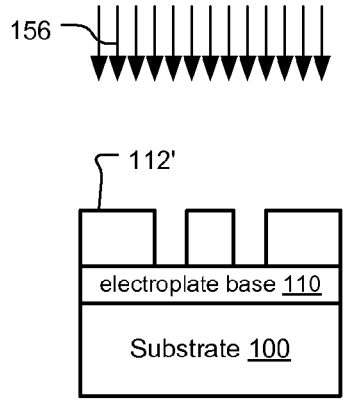

Then using the patterned titanium layer 114' as a mask, a directional plasma etching process 156 is used to etch deep through the main photo-resist layer to produce a "negative" of the desired diffractive optic pattern such as a zone plate pattern in a patterned first photoresist layer 112'. This step will typically remove the top binary photo-resist 116' and titanium layer 114', as shown in FIG. 1F.

Figure 1G:
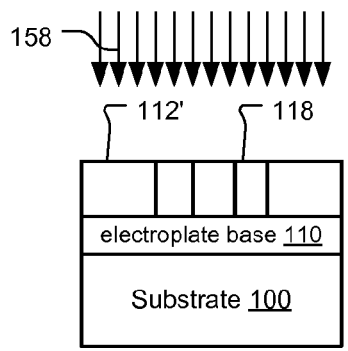
Figure 1H:
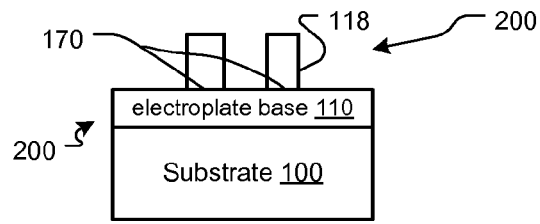

The assembly including the patterned first photoresist layer 112' is then placed in an electroplating bath and the metallic zones 118 are formed through the open areas defined by the "negatives" of the patterned photoresist 112', as shown in FIG. 1G. A common material for the zone plate layer is gold. In other examples, the diffractive or zone plate layer is tungsten or silver or copper. Still other metals are cobalt, copper, platinum, or lead. Finally, the remaining portions of the first photoresist 112' are removed by a further dry etching process, leaving on the desired structures, such as a zone pattern, 118, as shown in FIG. 1H.

FIGS. 2A-2H show an exemplary lift-off process for diffractive x-ray optics fabrication, which is used according to another fabrication process.

A substrate 100 is first coated with first layer of photo-resist 112 as shown in FIGS. 2A and 2B. The thickness of the first photo-resist 112 should equal the thickness of the desired nanostructures and is usually controlled with a spinning technique by adjusting the photo-resist viscosity and spinning speed.

Then the metal barrier layer 114, such as titanium, of several nanometers thickness is deposited on the first photoresist 112 followed by a thin layer of a binary photo-resist 116 as shown in FIG. 2B.

The desired pattern is then generated by selectively exposing the top layer binary photoresist 116 with patterned radiation or energetic particles 153 in step 2C. In some examples, UV, EUV, or x-ray radiation is used in combination with the mask 152. In other examples, an electron beam writer is used to directly write the desired pattern into the binary resist 116.

After the exposure process, a wet chemical etch process is used to remove the irradiated regions to produce a patterned binary photo-resist 116' and therefore selectively expose the titanium barrier layer 114, as shown in FIG. 2D. A further wet chemical etching process 154 removes the exposed titanium regions to form a patterned titanium layer 114' as shown in FIG. 2E.

Then using the patterned titanium layer 114' as a mask, a directional plasma etching process 156 is used to etch deep through the main photoresist layer 112 to produce a "negative" of the desired diffractive optic pattern such as a zone plate pattern in the patterned first photoresist layer 112'. This step will typically remove the top binary photo-resist 116' and titanium layers 114', as shown in FIG. 2F.

The assembly including the patterned first photoresist layer 112' is then exposed to a directional deposition process 158 such as evaporation, as shown in FIG. 2G or a non-direction deposition process to deposit the diffractive layer. This deposition forms the diffractive optic, such as metallic zones 118, through the open areas defined by the "negatives" of the patterned photoresist 112'. A common material for the zone plate layer is gold, silicon or tungsten. Still other metals are cobalt, copper, platinum, or lead. Finally, the remaining portions of the first photoresist 112' are removed by a further dry etching process or other lift-off process 159, leaving on the desired structures or zone pattern 118, as shown in FIG. 1H.

Figure 3:
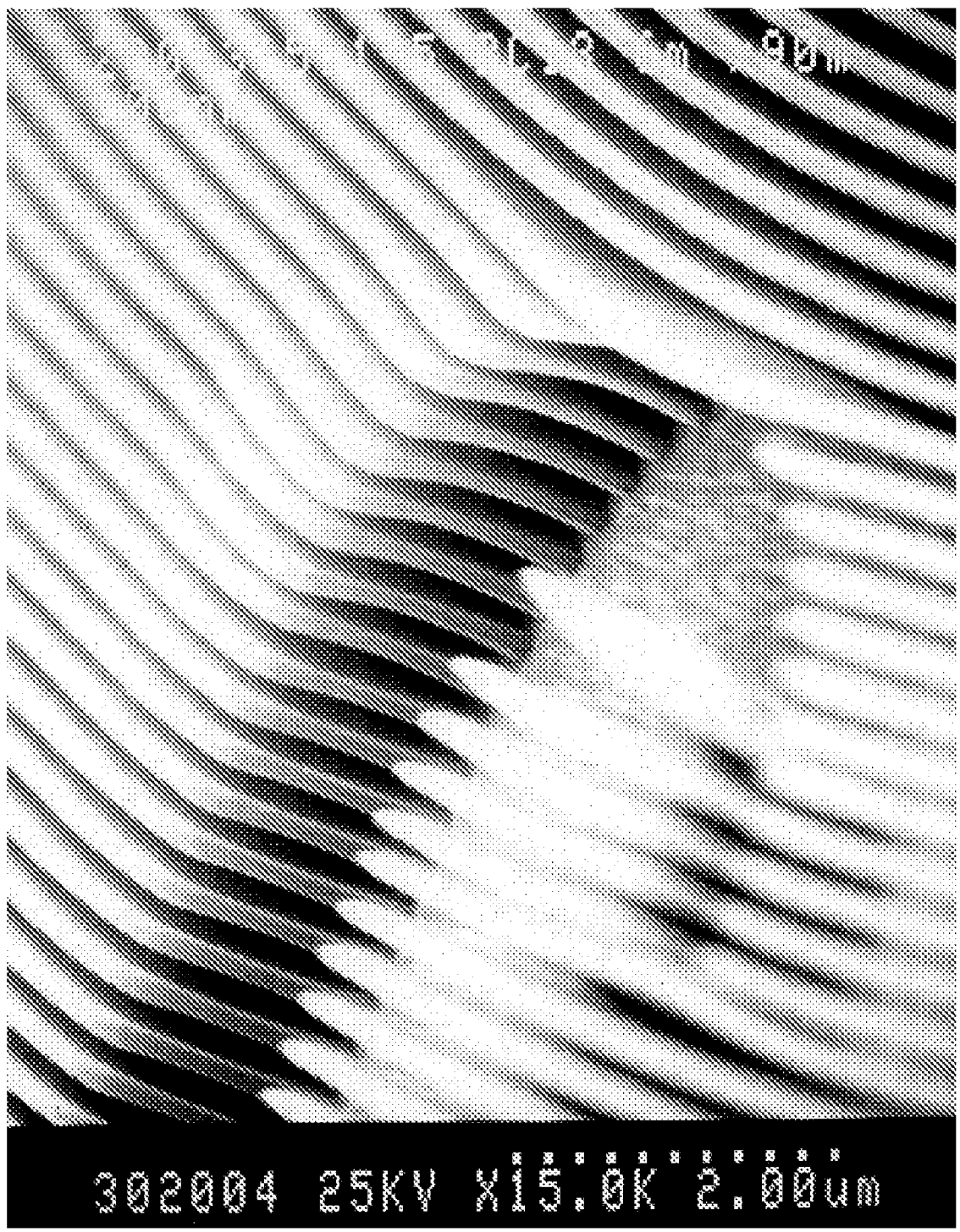
FIG. 3 is an image of a zone plate lens with aspect ratio of 15 acquired with a scanning electron microscope.

Note that the zone structures 118 of the diffractive layer of the zone plate 200, which are formed with these methods shown in FIGS. 1A-1H and 2A-2H, are connected only at the bottom 170 to the substrate 100, and possibly via the electroplate base 110, other intervening layer, or directly to the substrate 100, and can thus be unstable at high aspect ratios. For example, zone plates can suffer from deterioration of performance when used in intense x-ray beams for an extended period of time, as shown in FIG. 3. The cause of the lose of performance, mainly in term of reduction of x-ray diffraction efficiency, is due to the outer most zones shifting, tilting and falling over to each other. The tilting may also be caused by stress in the small amount of remaining polymer that was left over from zone plate fabrication process, or may be due to the stress at interface between zones and base at or near the interface at the structure bottoms 170.

In a current embodiment, this tilting of the zones is prevented by depositing a continuous or non-continuous layer of material, usually a metal and preferably a low density metal.

The material layer is deposed on the top of the structure or zones 118, on an opposite side of the structures 118 from the substrate 100. The deposited top layer anchors top of the structures or zones together, bridging between the structures, while foot 170 of the zones 118 are attached to the plating base 110 or substrate. An additional benefit of this hardening process is that since zone plate is covered by a layer of thin film, it is less susceptible to mechanical shock, vibration and moisture, and it can even be brushed and cleaned.

The thin film material of the top coating is preferably a low density and low Z number material, so that x-rays easily pass through this material and the amount of phase shift it produces is significantly less than what the zone plate material 118 itself produces. Ideally, the material should also be a metal material that can be easily deposited by evaporation.

Figures 4A, 4B:
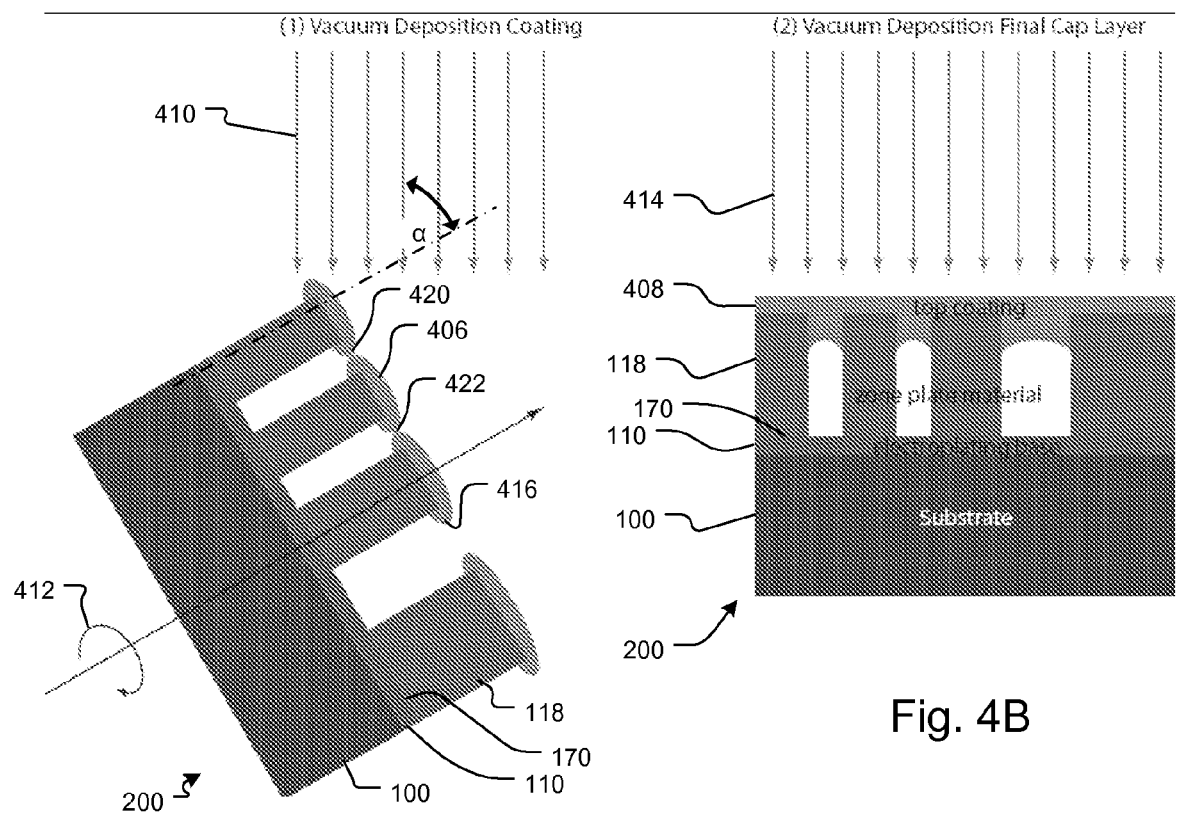
FIGS. 4A and 4B are schematic views showing a top coating process according to embodiments of the present invention.

FIGS. 4A and 4B show the deposition process used in one embodiment. The thin film material used is low-Z and strong metal, e.g. titanium, molybdenum, and/or aluminum. In other examples, chromium or nickel is used.

In an exemplary process, the zone plate 200 was first coated with a thin layer 406 of titanium, molybdenum, and/or aluminum by electron-beam evaporation 410 with the substrate 100 positioned at an oblique angle α to the path of the directional deposition process. In one example, the first thin top layer 406 is coated to a thickness of 10 to 200 nm. In a current embodiment, the thickness is about 40 to 120 nanometers, or about 80 nm thick. In other examples, the metal coating is chromium or nickel.

Figure 6A:
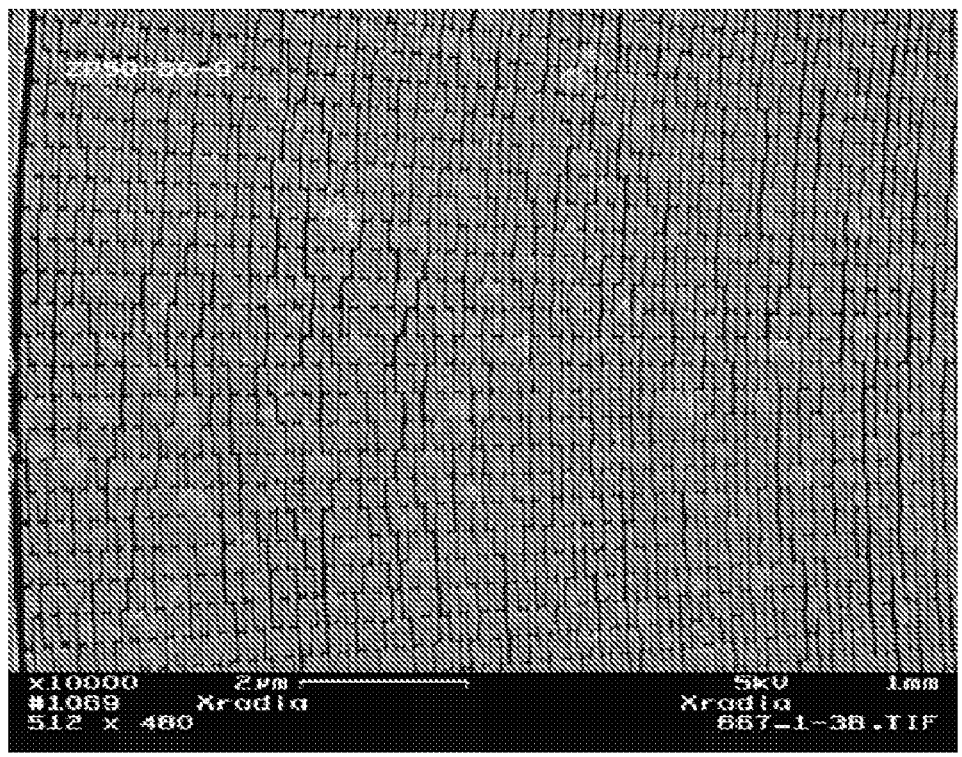
FIGS. 6A and 6B are images of a zone plate during and after, respectively, the top coating process according to an embodiment of the present invention.

In some examples, this initial deposition is enough for the top layer to begin the process of bridging between at least some of structures, see references 420, 422, but possibly not between all of the structures, see reference 416. The angle α is between 30-75 degree off normal. Preferably the substrate 100 is also rotated 412 by a rotation stage at 50-200 revolutions per minute (RPM) during the evaporation process. Because of shadowing effect from neighboring zones, angle deposition only covers the top edge of the zones rather than filling all of the gaps completely between zones 416, in some examples. This incomplete filling is shown in FIG. 6A.

Figure 6B:
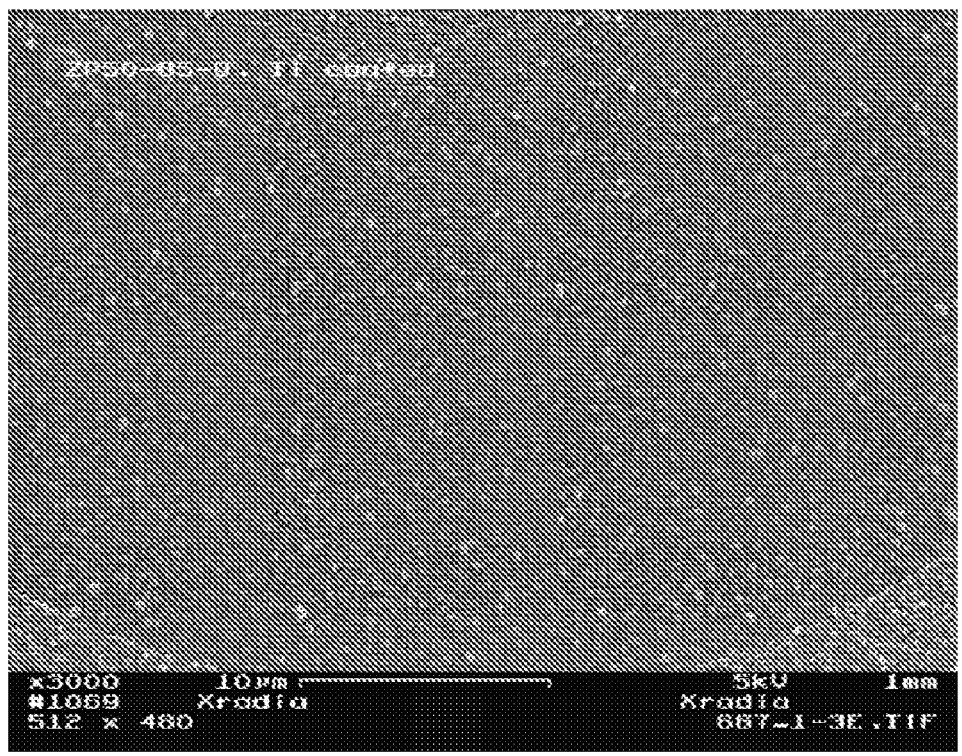

Then a second deposition 414 of 20 to 300 nm thick titanium, molybdenum, chromium, nickel, and/or aluminum, preferably 50 to 200 nm, or about 100 nm thick titanium is deposited at normal angle to produce the final top cap layer 408, which is needed to cap the zone plate, as shown in FIG. 4B, and fill the gaps 416 joining the zones together. The completed top cap layer 408 is shown in FIG. 6B.

It should be noted, however, that the top cap layer 408 does not need to bridge every gap between the structures 118. Only the structures with the highest aspect ratios are in the greatest danger of damage and toppling over. Thus in some embodiments, the top layer 408 is thin to only bridge between the smaller structures, such as the outer zone structures of a zone plate lens.

Since zone plates have many different sizes for the out most zones, the gap between zones varies with zone plate specs. Therefore, the thickness of the top cap layer 408 layer should be scaled according to the outer most zone width of the zone plate.

Figure 5:
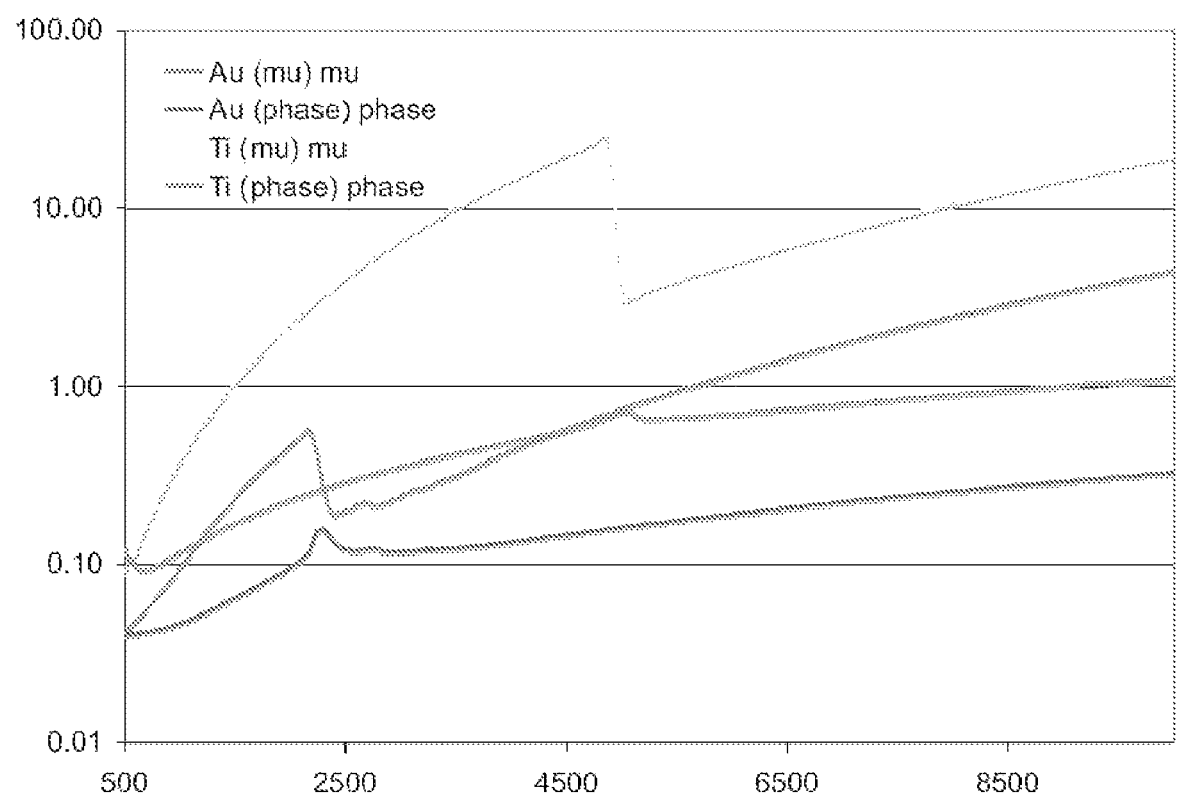
FIG. 5 is a plot of the 1/e attenuation length and 2 p phase shift length for gold and titanium.

FIG. 5 shows that 1/e attenuation length and 2 p phase shift length for two typical zone plate material, gold, and top coating material titanium. This shows that titanium minimizes absorption in the structural top coating layer While this invention has been particularly shown and described with references to preferred embodiments thereof, it will be understood by those skilled in the art that various changes in form and details may be made therein without departing from the scope of the invention encompassed by the appended claims.

What is claimed is:

1. A diffractive x-ray optic, comprising:
   a substrate;
   a diffractive layer of zone structures spaced apart at varying distances from one another and disposed and connected only along a bottom surface to the substrate, said zone structures having aspect ratios of 3-100 and varying zone widths including 15-100 nm; and
   a first top layer, to prevent tilting of the zone structures, disposed along and adjacent to opposite top surfaces of the diffractive layer of zone structures from the substrate, the first top layer spaced away from the substrate and bridging over gaps between at least some of zone structures along a height of the diffractive layer zone structures.

2. An optic as claimed in claim 1, wherein the structures form a periodic grating diffractive optic.

3. An optic as claimed in claim 1, wherein the structures form a zone plate lens diffractive optic.

4. An optic as claimed in claim 1, wherein the diffractive layer comprises gold.

5. An optic as claimed in claim 1, wherein the diffractive layer comprises tungsten.

6. An optic as claimed in claim 1, wherein the diffractive layer comprises silicon.

7. An optic as claimed in claim 1, wherein the first top layer comprises titanium.

8. An optic as claimed in claim 1, wherein the first top layer comprises molybdenum.

9. An optic as claimed in claim 1, wherein the first top layer comprises aluminum.

10. An optic as claimed in claim 1, wherein the first top layer has a thickness of 50-500 nm.

11. An optic as claimed in claim 1, wherein the first top layer creates voids defined in a lateral direction between the structures and defined in a vertical direction between the top layer and the substrate.

12. An optic as claimed in claim 1, further comprising a second top layer disposed onto the first top layer to seal a zone plate of the diffractive zone structures, wherein tops of the diffractive zone structures are secured and bridged over the gaps by said first and second top layers, and bottoms of the diffractive zone structures are secured to said substrate.

13. A method for fabricating a diffractive x-ray optic, the method comprising:
   on a substrate, forming a diffractive layer of zone structures spaced apart at varying distances from one another and disposed and connected only along a bottom surface to the substrate, said zone structures having aspect ratios of 3-100 and varying zone widths including 15-100 nm; and
   depositing a first top layer, to prevent tilting of the zone structures, disposed along and adjacent to opposite top surfaces of the diffractive layer of zone structures from the substrate, the first top layer spaced away from the substrate and bridging over gaps between at least some of zone structures along a height of the diffractive layer zone structures.

14. A method as claimed in claim 13, wherein the step of forming the diffractive layer comprises forming the structures into a periodic grating.

15. A method as claimed in claim 13, wherein the step of forming the diffractive layer comprises forming the structures into a zone plate lens.

16. A method as claimed in claim 13, wherein the diffractive layer comprises gold.

17. A method as claimed in claim 13, wherein the diffractive layer comprises tungsten.

18. A method as claimed in claim 13, wherein the diffractive layer comprises silicon.

19. A method as claimed in claim 13, wherein the first top layer comprises titanium.

20. A method as claimed in claim 13, wherein the first top layer comprises molybdenum.

21. A method as claimed in claim 13, wherein the first top layer comprises aluminum.

22. A method as claimed in claim 13, wherein the first top layer has a thickness of 50-500 nm.

23. A method as claimed in claim 13, wherein step of depositing the first top layer comprises depositing at least part of the top layer at an angle of 30-75 degrees to a plane of the substrate.

24. A method as claimed in claim 23, wherein step of depositing the top layer further comprises depositing part of the first top layer at an angle about normal to the plane of the substrate.

25. A method as claimed in claim 13, wherein step of depositing the first top layer comprises depositing at least part of the top layer at an angle about normal to the plane of the substrate.

26. A method as claimed in claim 13, wherein the first top layer creates voids defined in a lateral direction between the structures and defined in a vertical direction between the top layer and the substrate.

27. An method as claimed in claim 13, further comprising depositing a second top layer disposed onto the first top layer to seal a zone plate of the diffractive zone structures, wherein tops of the diffractive zone structures are secured and bridged over the gaps by said first and second top layers, and bottoms of the diffractive zone structures are secured to said substrate.

* * * * *